United States Patent Office 3,472,920
Patented Oct. 14, 1969

3,472,920
O-METHYL - N - ISOPROPYLAMIDO-O-(2-NITRO-PHENYL)-THIONOPHOSPHORIC ACID ESTER
Gerhard Schrader, Wuppertal-Cronenberg, Ludwig Eue, Cologne-Stammheim, and Helmuth Hack, Cologne-Buchheim, Germany, assignors to Farbenfabriken Bayer Aktiengesellschaft, Leverkusen, Germany, a corporation of Germany
No Drawing. Filed Dec. 30, 1966, Ser. No. 606,055
Int. Cl. C07f 9/24, 9/18; A01n 9/36
U.S. Cl. 260—954                             1 Claim

ABSTRACT OF THE DISCLOSURE

O - methyl-N-isopropylamido-O-(2-nitrophenyl)-thionophosphoric acid ester which possesses herbicidal properties and which may be prepared by conventional procedures.

The present invention relates to and has for its objects the provision for a particular new amidothionophosphoric acid ester which possesses valuable herbicidal properties; active compositions in the form of mixtures thereof with solid and liquid dispersible carrier vehicles; and methods for its preparation and use, especially for combatting weeds, undesired plants, and the like; with other and further objects of this invention becoming apparent from a study of the within specification and accompanying examples.

Amidothionophosphoric acid esters of the general formula

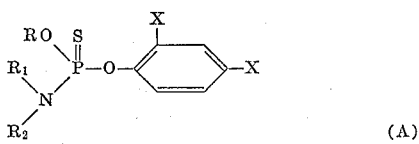

are already known from British Patent 659,682. In the above formula, R stands for an alkyl or alkenyl radical, $R_1$ and $R_2$ stand for alkyl groups although $R_2$ may also stand for hydrogen, one of the symbols X stands for a nitro group and the other X stands for hydrogen or a further $NO_2$ group. According to the data given in said British patent, the products of the above structure are, inter alia, valuable insecticides and fungicides, although there is no mention therein of whether the active compounds concerned also have herbicidal activity or whether such activity could be expected.

Also, in U.S. Patent 3,074,790 a method is described for combatting undesired plant growth by the use of amidothionophosphoric acid esters, in particular O-methyl - N-isopropylamido-O-(2,4-dichlorophenyl)thionophosphoric acid ester (B).

It has now been found in accordance with the present invention that the particular new compound, O-methyl-N-isopropylamido-O-(2-nitrophenyl)-thionophosphoric acid ester having the formula

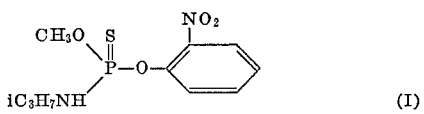

possesses valuable herbicidal properties.

It has been furthermore found in accordance with the present invention that a process for producing the instant compound in a simple manner and with good yields may now be provided which comprises reacting O-methyl-N-isopropylamido-thionophosphoric acid ester halides either with 2-nitrophenol in the presence of acid-binding agents, or with a salt of 2-nitrophenol.

Significantly, the instant amidothionophosphoric acid ester of the present invention possesses outstanding herbicidal properties and is, surprisingly, in this respect clearly superior to the products having an analogous constitution and similar activity known from the literature mentioned above. The compound of the present invention therefore represents a real advance in the art.

The course of the reaction according to the present process may be explained by the following equation:

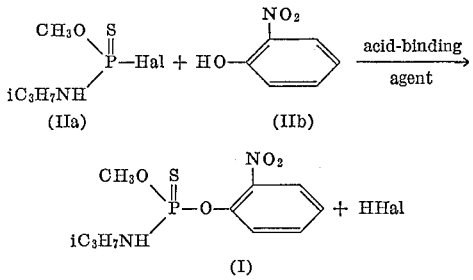

In the above formulate, Hal stands for a halogen atom, such as chloro, bromo, iodo and fluoro, yet is preferably a chlorine atom. The O-methyl-N-isopropylamido--thionophosphoric acid halides required as starting materials for carrying out the instant process are known from the literature; they can also be prepared on a technical scale, e.g., according to the instructions of British Patent 656,-682, from alkali metal methylate (such as sodium methylate) and the corresponding N-isopropylamido-thionophosphoric acid dihalides. The latter can also be obtained by known methods by the reaction of isopropyl-ammonium-hydrohalide with an excess of thiophosphoryl halide. Especially good yields of N-isoproylamido-thionophosphoric acid dihalides are obtained when 2 to 4 mols of thiophosphoryl halide are used for each mol of ammonium salt and the reaction is carried out at the boiling temperature of the mixture, whereby to achieve the splitting off of hydrogen halide. When the reaction is completed, the reaction mixture may be subjected to a fractional distillation and in this way the N-isopropylamido-thionophosphoric acid dihalide may be isolated in the pure form. The halides contemplated hereinabove are preferably the corresponding chlorides.

The process of the present invention is preferably carried out in the presence of inert organic solvents or diluents. Particularly suitable for this purpose are aliphatic or aromatic hydrocarbons (which may optionally be halogenated), for example benzene, methylene chloride, chloroform, carbon tetrachloride, benzene, chlorobenzene, toluene or xylene; ethers, for example diethyl or dibutyl ether, dioxane and tetrahydrofuran; and low boiling aliphatic alcohols or ketones, for example methanol, ethanol, isopropanol, acetone, methyl ethyl ketone, methyl isopropyl ketone and methyl isobutyl ketone. Also, lower aliphatic nitriles, for example acetonitrile and propionitrile, have proved to be especially suitable.

As already mentioned above, the reaction may be carried out in the presence of acid-binding agents. For this purpose, there may be used alkali metal carbonates or alcoholates, such as potassium- or sodium-carbonate, methylate or ethylate, and the like, or tertiary, aliphatic, aromatic or heterocyclic bases, for example triethylamine, diethyl aniline, pyridine, and the like.

Instead of working in the presence of an acid-binding agent, it is also possible to prepare a salt, preferably an alkali metal (e.g., sodium, potassium, lithium, etc.) or ammonium salt, of 2-nitrophenol in substance or in solution and then to react this salt with the O-methyl-N-isopropylamido-thionophosphoric acid halide in accordance with the present invention.

It is possible advantageously to carry out the reaction of the present invention within a fairly wide temperature range. The reaction is generally carried out at temperatures between about 30 and 110° C., and preferably at about 40 to 70° C.

As can be seen from the above reaction equation, about 1 mol of 2-nitrophenol and acid-binding agent (or 2-nitrophenol salt) is used for each mol of O-methyl-N-isopropylamido-thionophosphoric acid halide.

It has been found particularly advantageous to add first the acid-binding agent to the solution or suspension and then, after completion of the salt formation, the O-methyl-N-isopropylamido-thionophosphoric acid halide at the above stated temperatures, while stirring. After combining the starting components the reaction mixture is stirred for a prolonged period of time (1 to 4 hours), if necessary with heating, to complete the reaction.

The reaction mixture may be worked up in a generally known manner by pouring it into ice water, taking up the product (which generally precipitates in oily form) in a water-immiscible inert solvent, preferably in a hydrocarbon, washing the resulting solution with water, drying the organic phase, distilling off the solvent and further heating the residue at slightly or moderately elevated temperatures under reduced pressure.

A special method of carrying out the instant process comprises adding 1 mol of alkali metal- or ammonium-2-nitrophenolate (or 1 mol of free nitrophenol and of acid-binding agent), dissolved in one of the aforementioned inert solvents, preferably methanol, portionwise to 1 mol of N-isopropylamido-thionophosphoric acid dihalide, subsequently heating the mixture at 45 to 70° C. for a short time, then cooling it to room temperature and mixing it with a methanol solution of 1 mol of alkali metal methylate. To complete the reaction, the reaction mixture is again briefly heated to a temperature of 40 to 70° C., and the excess of methanol is distilled off under reduced pressure. The residue is taken up in a water-immiscible solvent, preferably in one of the above-mentioned hydrocarbons or ethers, the resulting solution then washed with water and with an optionally dilute sodium hydroxide solution or ammonia, and the organic phase thereafter dried. The solvent is finally removed by distillation.

Alternatively, it is also possible to reverse the sequence of the combination of the starting materials, i.e., to react first the N-isopropyl-thionophosphoric acid dihalide with the alkali metal methylate solution, followed by the reaction of the intermediate product formed with the 2-nitrophenolate. When applying this variant of the instant process the conditions of the reaction may be the same as those mentioned above.

The instant O-methyl-N-isopropylamido-O-(2-nitrophenyl)-thionophosphoric acid ester is a colorless or slightly yellow water-insoluble oil which cannot be distilled without decomposition even under strongly reduced pressure.

When administered to rats per os, the instant compound has a mean toxicity towards warm-blooded animals of 50 mg./kg. of animal weight.

It has already been mentioned that the compound of the present invention is distinguished by superior herbicidal properties in comparison with previously known compounds synthesized in an analogous manner and used for the same purpose. This outstanding activity consists in an increase of the general herbicidal potency. When used in larger quantities (for example substantially between about 20 to 40 kg. active substance per hectare) the preparation has the action of a total herbicide, whereas at lower concentrations (for example substantially between about 2.5–5 kg. per hectare) it is an excellent selective herbicide.

On account of the aforementioned properties which influence plant growth, the O-methyl-N-isopropylamido-O-(2-nitrophenyl)-thionophosphoric acid ester of the present invention can be used as germination inhibiting agent, and particularly as weed killer while not harming commercially desirable agricultural crops. The term "weeds" is used herein in the widest sense to include all plants which grow in places where they are not desired. Whether the active compound prepared according to the present invention acts as a total or selective herbicide, essentially depends on the amounts used, as may be seen from the abovementioned numerical values and from the table below.

Advantageously, the particular new compound of the present invention can be used, e.g., as a herbicide for the following plants: dicotyledons, such as mustard (Sinapis), cress (Lepidium), catch weed (Galium), chick weed (Stellaria), camomile (Matricaria), French weed (Galinsoga), goose-foot (Chenopodium), stinging nettle (Urtica), groundsel (Senecio), cotton (Gossypium), beets (Beta), carrots (Daucus), beans (Phaseolus), potatoes (Solanum), coffee (Coffea), and the like; and monocotyledons, such as timothy grass (Phleum), meadow grass (Poe), fescue grass (Festuca), eleusine (Eleusine), bristile grass (Setaria), ray grass (Lolium), brome grass (Bromus), barnyard grass (Echinochloa), maize (Zea), rice (Oryza), oats (Avena), barley (Hordeum), wheat (Triticum), millet (Panicum), sugar cane (Saccharum), and the like.

The plant species set forth in the above enumeration are to be understood as representative examples of the genus designated in Latin. The hebicidal applicability of the instant active compound is, however, in no way limited to these genera, but relates to other plants in the same way.

The active compound according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agent with dispersible liquid diluent carriers and/or dispersible solid carriers optionally with the use of carrier vehicle assistants, e.g., surface-active agents, including emulsifying agents and/or dispersing agents, whereby, for example, in the case where water is used as diluent, organic solvents may be added as auxiliary solvents (cf. Agricultural Chemicals, March 1960, pp. 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fraction), chlorinated aliphatic hydrocarbons (for instance, methylene chloride, etc.), alcohols (for instance, methanol, ethanol, propanol, butanol, etc.), ethers, ether-alcohols (for instance, glycol monomethyl ether, etc.), amine (for instance, ethanolamine, etc.), amides (for instance, dimethyl formamide, etc.), sulfoxides (for instance, dimethyl sulfoxide, etc.), ketones (for instance, acetone, etc.), and water; as well as dispersible finely divided solid carriers, such as ground natural minerals (for instance, kaolins, alumina, silica, chalk, i.e., calcium carbonate, talc, kieselguhr, etc.), and ground synthetic minerals (for instance, highly dispersed silicic acid, silicates, e.g., alkali silicates, etc.); whereas the following may be chiefly considered for use as carrier vehicle assistants, e.g., surface-active agents, for this purpose: emulsifying agents, such as nonionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compound according to the instant invention may be present in such formulations or compositions by itself or in the form of mixtures with other known active substances, if desired.

The substance according to the invention may be employed, therefore, by itself as the artisan will appreciate, in the form of its compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1 and 95% by weight, and preferably 0.5 and 90% by weight, of the mixture, whereas carrier composition mixtures suitable for direct application or field application generally contemplate those in which the active compound is present in an amount substantially between about 0.01 and 20%, preferably 0.05 and 10%, by weight of the mixture. Thus, the present invention contemplates over-all compositions which comprise mixtures of a dispersible carrier vehicle such as (1) a dispersible carrier solid, or (2) a dispersible carrier liquid preferably including a carrier vehicle assistant, e.g., a surface-active agent, such as an emulsifying agent and/or a dispersing agent, and an amount of the active compound which is effective for the purpose in question and which is generally between about 0.01 and 95% by weight of the mixture. Specifically, the active compound may be applied to a surface area, such as in pre-emergence or post-emergence use, in total herbicide concentrations substantially between about 20 and 40 kg. per hectare, and in selective herbicide concentrations substantially between about 2.5 and 5 kg. per hectare, although it will be appreciated that in connection with the pre-emergence use of the instant compounds, as well as the post-emergence use thereof, the concentration may be varied within a fairly wide range, depending upon various factors such as cultivation, soil, weeds, weather, as well as the purpose of application in each case and the results desired. Preferably, the application should be undertaken before the emergence of the weeds although it is not of importance whether the cultivated plants have emerged or not since the general state of development of the cultivated plants will not be adversely affected except where total herbicide concentrations are used.

Furthermore, the present invention contemplates methods of selectively controlling or combating undesired plants, e.g., weeds and the like, which comprise applying to at least one of (a) such weeds and (b) their habitat, a herbicidally effective amount of the particular active compound of the invention alone or together with a carrier vehicle as noted above. The instant formulations or compositions are applied in the usual manner, for example, by spraying, atomizing, scattering, dusting, watering, sprinkling, and the like, whether for pre-emergence application to the soil or post-emergence application to the weeds.

The outstanding herbicidal action of the present compound as well as its clear technical superiority in comparison with the prior art can be seen from the following example, set forth by way of illustration and not limitation:

EXAMPLE 1

Pre-emergence test

Solvent:
  Acetone _____ 5 Parts by weight
Emulsifier:
  Benzyloxy polyglycol ether _____ 1 Part by weight To produce a suitable preparation of the given active compound, 1 part by weight of such active compound is mixed with the stated amount of solvent, the stated amount of emulsifier is then added and the resulting concentrate is diluted with water to the desired final concentration.

Seeds of the test plant are sown in normal soil and, after 24 hours, watered with the preparation of the given active compound. It is expedient to keep constant the amount of water per unit area. It will be appreciated that the concentration of the active compound in the preparation is of no importance, only the amount of active compound applied per unit area being decisive. After three weeks, the degree of damage to the test plants is determined and characterized by the values 0–5, which have the following meaning:

0—No effect
1—Slight damage or delay in growth
2—Marked damage or inhibition of growth
3—Heavy damage and only deficient development or only 50% emerged
4—Plants partially destroyed after germination or only 25% emerged
5—Plants completely dead or not emerged.

The active compounds, the amounts applied and the results obtained can be seen from the following table:

TABLE.—PRE-EMERGENCE TEST

| Active compound (constitution) | Concentration of active compound, kg./ha. | Wheat | Barley | Rice | Cotton | Maize | Cabbage | Echinochloa | Sinapsis | Portulaca | Chenopodium | Stellaria | Amaranthus | Digitaria |
|---|---|---|---|---|---|---|---|---|---|---|---|---|---|---|
| (B) $CH_3O\underset{iC_3H_7-NH}{\overset{S}{\diagdown}}P-O-\diagup\!\!\!\diagup\!\!\!\diagup\text{-Cl, Cl}$ (Known from U.S. Patent 3,074,780) | 20 | 2 | 2 | 3 | 2 | 3 | 2 | 5 | 2 | 5 | 5 | 5 | 4 | 5 |
| | 10 | 0 | 0 | 1 | 1 | 2 | 1 | 5 | 0 | 4 | 5 | 5 | 3 | 5 |
| | 5 | 0 | 0 | 0 | 0 | 0 | 0 | 5 | 0 | 2 | 5 | 3 | 1 | 5 |
| | 2.5 | 0 | 0 | 0 | 0 | 0 | 0 | 4-5 | 0 | 0 | 3-4 | 1 | 0 | 4-5 |
| | 1.25 | 0 | 0 | 0 | 0 | 0 | 0 | 4 | 0 | 0 | 3 | 0 | 0 | 4 |
| (I) $CH_3O\underset{iC_3H_7-NH}{\overset{S}{\diagdown}}P-O-\diagup\!\!\!\diagup\!\!\!\diagup\text{-NO}_2$ (According to invention) | 20 |  | 4 | 5 | 4 | 3 | 4-5 | 5 | 5 | 5 | 5 | 5 | 5 | 5 |
| | 10 | 1-2 | 2 | 3 | 2 | 3 | 2 | 5 | 5 | 5 | 5 | 5 | 5 | 5 |
| | 5 | 1 | 1 | 1 | 0 | 0 | 0 | 5 | 4-5 | 5 | 5 | 5 | 4-5 | 5 |
| | 2.5 | 0 | 0 | 0 | 0 | 0 | 0 | 5 | 4 | 4-5 | 4-5 | 4-5 | 3 | 4-5 |
| | 1.25 | 0 | 0 | 0 | 0 | 0 | 0 | 5 | 3 | 2 | 2 | 2 | 1 | 3 |

The following example is given for the purpose of illustrating, without limitation, the process for preparing the particular new compound of the present invention:

EXAMPLE 2

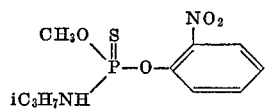

69 grams (0.5 mol) of 2-nitrophenol are dissolved in 400 cc. of acetonitrile. 80 grams of dried and sifted potassium carbonate are added to this solution, which is subsequently treated dropwise, with vigorous stirring, at 50 to 60° C. with 95 grams (0.5 mol) of O-methyl-N-isopropylamido-thionophosphoric acid ester chloride. The mixture is then heated at 60° C. for a further three hours, and the reaction mixture is thereafter cooled to room temperature and poured into 400 cc. of ice water. The precipitated oil is taken up in 300 cc. of benzene, the benzene solution washed several times with water and subsequently dried over sodium sulfate. After distilling off the solvent, the residue is heated for a short time under a pressure of 0.01 mm. Hg at a bath temperature of 60 to 70° C. There are thus obtained 98 grams (68% of theory) of the compound O-methyl-N-isopropylamido-O - (2 - nitrophenyl) - thionophosphoric acid ester in the form of a pale yellow, water-insoluble oil.

*Analysis.*—Calculated for a molecular weight of 290: N, 9.6%; P, 10.7%; S, 11.0%. Found: N, 9.3%; P, 11.0%; S, 11.0%.

It will be appreciated that the instant specification and examples are set forth by way of illustration and not limitation, and that various modifications and changes may be made without departing from the spirit and scope of the present invention.

What is claimed is:

1. O - methyl - N - isopropylamido - O (2 - nitrophenyl)-thionophosphoric acid ester having the formula

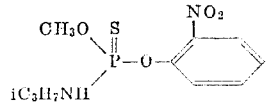

References Cited

FOREIGN PATENTS 659,682  10/1951  Great Britain.

CHARLES B. PARKER, Primary Examiner

ANTON H. SUTTO, Assistant Examiner

U.S. Cl. X.R.

71—87; 260—973

PO-1050
(5/69)

UNITED STATES PATENT OFFICE
CERTIFICATE OF CORRECTION

Patent No. 3,472,920      Dated October 14, 1969

Inventor(s) GERHARD SCHRADER, LUDWIG EUE and HELMUTH HACK

It is certified that error appears in the above-identified patent and that said Letters Patent are hereby corrected as shown below:

Column 4, line 48, "fraction" should be --fractions--; line 52, "amine" should be --amines--; columns 5-6 in the Table, the heading "Sinapsis" should be --Sinapis--; in line with the second formula under the heading "Wheat", the first vertical number omitted should be --4-- followed immediately below by 1-2; column 6, line 75, in Example 2 indicate on the left side of the formula --(I)--

SIGNED AND
SEALED
APR 28 1970

(SEAL)
Attest:

Edward M. Fletcher, Jr.
Attesting Officer

WILLIAM E. SCHUYLER, JR.
Commissioner of Patents